US010678049B2

United States Patent
Perreault et al.

(10) Patent No.: US 10,678,049 B2
(45) Date of Patent: Jun. 9, 2020

(54) NEAR-EYE DISPLAY HAVING LENSLET ARRAY WITH REDUCED OFF-AXIS OPTICAL ABERRATIONS

(71) Applicant: Google LLC, Mountain View, CA (US)

(72) Inventors: John D. Perreault, Mountain View, CA (US); Patrick Llull, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 204 days.

(21) Appl. No.: 15/832,012

(22) Filed: Dec. 5, 2017

(65) Prior Publication Data
US 2019/0129166 A1    May 2, 2019

Related U.S. Application Data

(60) Provisional application No. 62/579,266, filed on Oct. 31, 2017.

(51) Int. Cl.
*G03H 1/00*    (2006.01)
*G02B 27/01*   (2006.01)
(Continued)

(52) U.S. Cl.
CPC ..... *G02B 27/0101* (2013.01); *G02B 27/0025* (2013.01); *G02B 27/017* (2013.01); *G02B 27/0961* (2013.01); *G02B 2027/011* (2013.01)

(58) Field of Classification Search
CPC ............ G02B 27/0081; G02B 27/0093; G02B 27/0101; G02B 27/0025; G02B 27/0961;
(Continued)

(56) References Cited

U.S. PATENT DOCUMENTS

2017/0115432 A1*  4/2017  Schmidtlin ........ G02B 27/0172
2017/0171533 A1   6/2017  Benitez et al.
(Continued)

OTHER PUBLICATIONS

International Search Report and Written Opinion dated Aug. 13, 2019 for corresponding International Application No. PCT/US2018/041920, 13 pages.
(Continued)

*Primary Examiner* — Mustak Choudhury

(57) ABSTRACT

A near-eye display system includes a display panel to display a lightfield image comprising an array of elemental images and a lenslet array facing the display panel, the lenslet array comprising lenslets with spatially-varying prescriptions, such as different diameters, different focal lengths, and different asphere terms. The lenslet array further may be formed with a planar or non-planar substrate. The system further may include a distortion map comprising a set of transform matrices, each transform matrix configured to pre-distort a corresponding elemental image of a lightfield image so as to compensate for distortion expected to be introduced by a corresponding lenslet of the lenslet array, as well as a rendering component configured to modify the array of elemental images of a rendered lightfield using the distortion map to generate a modified lightfield image, and provide the modified lightfield image for display at the display panel for viewing via the lenslet array.

15 Claims, 7 Drawing Sheets

(51) Int. Cl.
*G02B 27/00* (2006.01)
*G02B 27/09* (2006.01)

(58) Field of Classification Search
CPC .................................. G02B 27/011;
G02B 27/017; G02B 27/0172; G02B
27/0176; G02B 27/0012; G02B 27/1066;
G02B 27/2214; G02B 3/0043; G02B
3/0056; G02B 3/0062; G02F 1/29; G06F
1/163; G06F 3/011; G06F 3/013; G02C
7/025
USPC ........ 359/13, 19, 201.1, 457, 623–632, 733,
359/754; 345/6; 348/E13.011, E13.028,
348/E13.065, E13.068
See application file for complete search history.

(56) References Cited

U.S. PATENT DOCUMENTS

2017/0336626 A1 11/2017 Hayashi et al.
2018/0288387 A1* 10/2018 Somanath ............ H04N 13/204

OTHER PUBLICATIONS

Anonymous, "Shack-Hartmann wavefront sensor", from Wikipedia <https://en.wikipedia.org/wiki/Shack%E2%80%93Hartmann_wavefront_sensor>, Accessed Jan. 24, 2018, 2 pages.
International Search Report and Written Opinion dated Oct. 22, 2018 for corresponding International Application No. PCT/US2018/041920, 13 pages.

* cited by examiner

NEAR-EYE DISPLAY HAVING LENSLET ARRAY WITH REDUCED OFF-AXIS OPTICAL ABERRATIONS

CROSS-REFERENCE TO RELATED APPLICATIONS

The present application claims priority to U.S. Provisional Patent Application No. 62/579,266, entitled "NON-UNIFORM LENSLET ARRAYS AND RENDERING METHODS FOR COMPUTATIONAL DISPLAYS" and filed on 31 Oct. 2017, the entirety of which is incorporated by reference herein.

BACKGROUND

Head-mounted displays (HMDs) and other near-eye display systems can utilize a near-eye lightfield display or other computational display to provide effective display of three-dimensional (3D) graphics. Generally, the near-eye lightfield display employs one or more display panels and one or more lenslet arrays that overlie the one or more display panels. A rendering system renders an array of elemental images, with each elemental image representing an image or view of an object or scene from a corresponding perspective or virtual camera position. In conventional near-eye displays, the lenslet array is composed of uniform lenslets disposed on a planar substrate. This arrangement results in off-axis optical aberrations, often manifesting as blurring, as a result of the skew between the elemental image and the lenslet array centers as the geometrical path length increases near the display edges. These focus errors often are detectable by the user, and thus detract from the viewing experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-7 illustrate example methods and systems for focus blur mitigation in a near-eye display system. In at least one embodiment, the near-eye display system employs a computational display to display near-eye lightfields to a user so as to provide the user with an immersive virtual reality (VR) or augmented reality (AR) experience. Each near-eye lightfield is composed of an array of elemental images, with each elemental image representing a view of an object or scene from a different corresponding viewpoint. An array of lenslets (hereinafter, "lenslet array") overlies the display panel and operates to present the array of elemental images to the user as a single autostereoscopic image.

To mitigate focus blurring resulting from the use of uniform lenslets and/or a planar substrate as found in conventional lenslet array implementations, in at least one embodiment the lenslet array of the near-eye display system utilizes lenslets with spatially-varying prescriptions (that is, each lenslet has a prescription based on its position within the array), or a non-planar substrate, or a combination of lenslet with spatially-varying prescriptions and a non-planar substrate. As described in greater detail herein, by utilizing non-uniform lenslets and/or a non-planar substrate, the field angles between the lenslets and the elemental images of a lightfield may be reduced, and thereby reducing blurring and other focus errors, and thus improving a user's experience when viewing the lightfield through the lenslet array.

Figure 1:
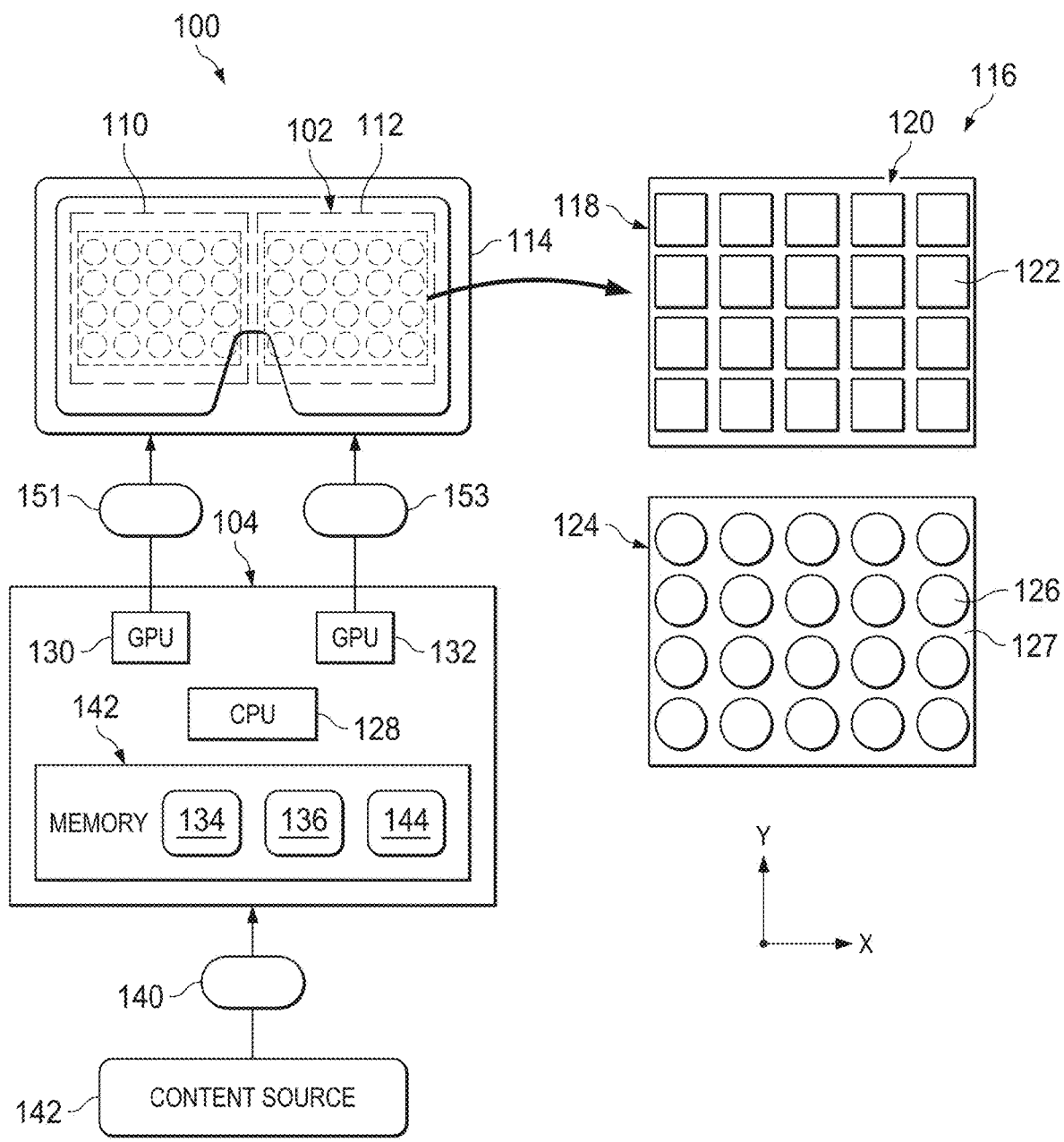
FIG. 1 is a diagram illustrating a near-eye display system employing a lenslet array configured to reduce off-axis optical aberrations in accordance with some embodiments.
Figure 2:
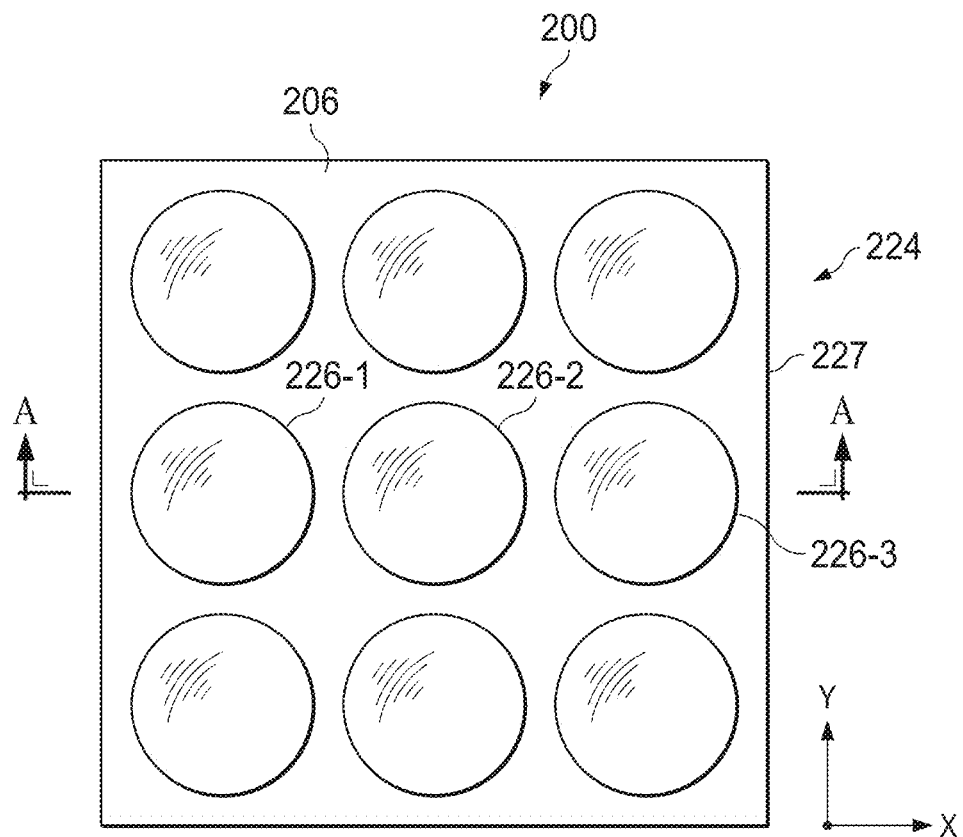
FIG. 2 is a diagram illustrating a top view and a cross-section view of an implementation of the lenslet array of FIG. 1 with a non-planar substrate in accordance with some embodiments.
Figure 2:
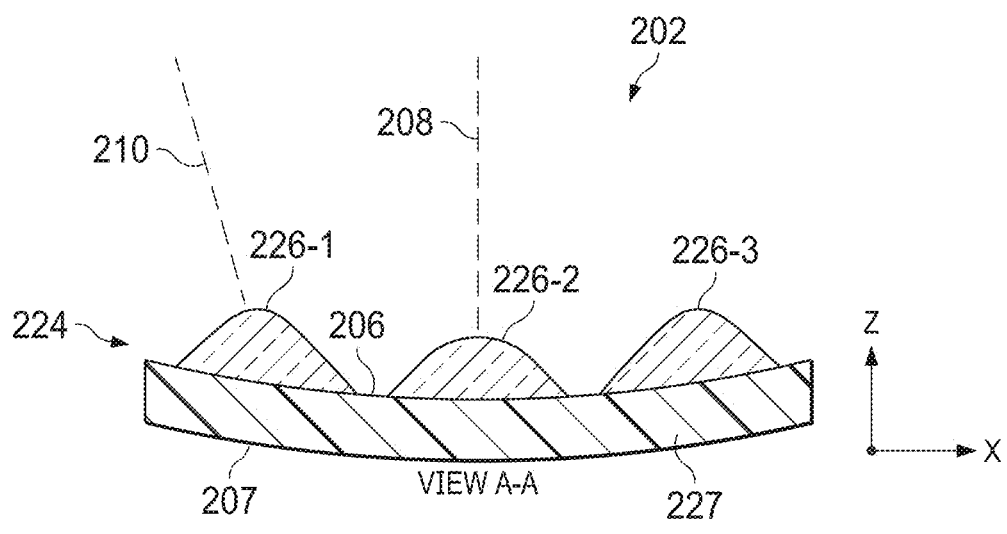

FIG. 1 illustrates a near-eye display system 100 incorporating mitigation of off-axis optical aberrations in accordance with at least one embodiment. In the depicted example, the near-eye display system 100 includes a computational display sub-system 102 and a rendering component 104. The near-eye display system 100 further can include other components, such as an eye-tracking subsystem, an inertial measurement unit (IMU), audio componentry, and the like, that have been omitted for purposes of clarity. The computational display sub-system 102 includes a left-eye display 110 and a right-eye display 112 mounted in an apparatus 114 (e.g., goggles, glasses, etc.) that places the displays 110, 112 in front of the left and right eyes, respectively, of the user.

As shown by view 116, each of the displays 110, 112 includes at least one display panel 118 to display a sequence or succession of near-eye lightfield images, each of which comprises an array 120 of elemental images 122. Each of the displays 110, 112 further includes an array 124 of lenslets 126 (also commonly referred to as "microlenses") disposed at a substrate 127 that is overlying the display panel 118. The lenslets 126 and substrate 127, in one embodiment, are a monolithic body cast or machined from one or a combination of materials, such as acrylic or other plastic, glass, and the like. In other embodiments, the lenslets 124 and substrate 127 are fabricated separately and then the lenslets 124 are mechanically attached to the substrate 127 using optical adhesive, press-fit tension, and the like. For purposes of reference, the display surface of the display panel 118 and a major surface of the lenslet array 124 are illustrated in FIG. 1 as being oriented in an X-Y plane.

Typically, the number of lenslets 126 in the lenslet array 124 is equal to the number of elemental images 122 in the array 120, but in other implementations the number of lenslets 126 may be fewer or greater than the number of elemental images 122. Note that while the example of FIG.

1 illustrates a 5×4 array 120 of elemental images 122 and a corresponding 5×4 array 124 of lenslets 126 for ease of illustration, in a typical implementation the number of elemental images 122 in a lightfield image 120 and the number of lenslets 126 in the lenslet array 124 typically is much higher. Further, in some embodiments, a separate display panel 118 is implemented for each of the displays 110, 112, whereas in other embodiments the left-eye display 110 and the right-eye display 112 share a single display panel 118, with the left half of the display panel 118 used for the left-eye display 110 and the right half of the display panel 118 used for the right-eye display 112.

With the lenslet array 124 overlying the display panel 118, each lenslet 126 focuses a corresponding region of the display surface of the display panel 118 onto the pupil of a corresponding eye of the user, with each such region at least partially overlapping with one or more adjacent regions. Thus, in such computational display configurations, when an array 120 of elemental images 122 is displayed at the display surface of the display panel 118 and then viewed by the eye through the lenslet array 124, the user perceives the array 120 of elemental images 122 as a single image of a scene. When this process is performed in parallel for both the left eye and right eye of the user with the proper parallax implemented therebetween, the result is the presentation of autostereoscopic three-dimensional (3D) imagery to the user with the relatively wide FOV and shallow form factor often provided by such computational displays.

In a conventional near-eye display system, the lenslet array disposed between the display panel and the user's eye is composed of an array of uniform lenslets (that is, lenslets all having the same prescription) disposed at a planar substrate. As such, the lenslets of a conventional lenslet array all have the same focal length and have optical axes that are orthogonal to the planar substrate and thus parallel to each other. This typically leads to the elemental images at the center of a displayed lightfield being perceived relatively sharply through a conventional lenslet array as these elemental images are at center of the display panel and are approximately at the focal length of the corresponding lenslets, and the field angle (that is, the angle between the optical axis of a lenslet and the principle ray of the elemental image primarily viewed by that lenslet) of the lenslet and corresponding elemental image is relatively small. However, the further a lenslet is positioned away from the center of the array, the greater the skew between the optical axis of the lenslet and the center of the corresponding elemental image, which in turn reflects an increasing disparity between the focal length of the lenslet and the geometrical path length between the lenslet and its corresponding elemental image and greater field angle between the lenslet and this elemental image. As a result, blurring and other off-axis optical aberrations increase in magnitude toward the periphery of an image perceived by the user's eye when viewing the displayed lightfield through a conventional lenslet array.

The lenslet array 124 of the near-eye display system 100 is configured to mitigate such off-axis optical aberrations and thus provide an improved user viewing experience. In at least some embodiments, this configuration includes configuring the lenslet array 124 so that the substrate 127 is non-planar; that is, the substrate 127 is curved about one or more axes. In other embodiments, this configuration includes configuring the lenslet array 124 so that the prescriptions of the lenslets 126 are spatially-varying; that is, each lenslet 126 has a prescription that is based at least in part on that lenslet's position within the lenslet array 124. The parameters of the prescriptions of the lenslets 126 that may differ in this manner include, for example, a diameter of the lenslet, a focal length of the lenslet, or the asphere parameters of the lenslet. In still other embodiments, the configuration of the lenslet array 124 includes configuring the lenslet array 124 to have both a non-planar substrate 127 and to have lenslets 126 with different prescriptions. Example implementations of the lenslet array 124 with such configurations are described below with reference to FIGS. 2-5.

As also shown in FIG. 1, the rendering component 104 includes a set of one or more processors, such as the illustrated central processing unit (CPU) 128 and graphics processing units (GPUs) 130, 132 and one or more storage components, such as system memory 134, to store software programs or other executable instructions that are accessed and executed by the processors 128, 130, 132 so as to manipulate the one or more of the processors to perform various tasks as described herein. Such software programs include, for example, rendering program 136 comprising executable instructions for a lightfield rendering process, as described below, as well as a lightfield modification program 138 comprising executable instructions for transforming generated lightfields to better match the optical parameters of the lenslet array 124, as also described below.

In operation, the rendering component 104 receives rendering information 140 from a local or remote content source 142, where the rendering information 140 represents graphics data, video data, or other data representative of an object or scene that is the subject of imagery to be rendered and displayed at the display sub-system 102. Executing the rendering program 136, the CPU 128 uses the rendering information 140 to send drawing instructions to the GPUs 130, 132, which in turn utilize the drawing instructions to render, in parallel, a series of initial, or raw, lightfield images for display at the left-eye display 110 and a series of initial, or raw, lightfield images for display at the right-eye display 112 using any of a variety of well-known VR/AR computational/lightfield rendering processes.

As described in detail herein, the lenslet array 124 uses one or both of a non-planar substrate or lenslets with different prescriptions. When a non-planar substrate is used, this introduces a non-zero optical power that should be accounted for. Likewise, when lenslets with different prescriptions are used, a given lenslet may distort a corresponding elemental image in a manner different than other lenslets warp their corresponding elemental images due to the differences in prescriptions. Accordingly, in at least one embodiment, the rendering component 104 may "pre-distort" the lightfield images generated by execution of the lightfield rendering program 136 to accommodate for the different distortions introduced by the different lenslets 126 of the lenslet array 126. To illustrate, in at least one embodiment a distortion map 144 is generated for the lenslet array 124, whereby the distortion map 144 comprises an array of pre-distortion transform matrices, with each transform matrix associated with a corresponding elemental image position and configured to pre-compensate for the distortion expected to be introduced by the corresponding lenslet 126 of the lenslet array 124 for that elemental image position. The pre-distort transform matrix for a given elemental image position this is based on the prescription of the corresponding lenslet 126 and the position of the elemental image position relative to the lenslet 126 (and the expected position of the user's eye), and may be determined via computational analysis of these parameters using any of a variety of techniques. Further, in some embodiments, the pre-distort transform matrix and the prescription for the corresponding lenslet may be co-optimized during development. In instances whereby the lenslets 124 have the same prescription but the substrate 127 is non-planar, the same pre-distort transform matrix may be applied for each elemental image.

To illustrate, for each initial lightfield image generated by the GPU 130 executing the lightfield rendering program 136, the GPU 130 further may execute the lightfield modification program 138 (which may be the same program as program 136) to use the distortion map 144 (stored, for example, in memory 134) to generate a corresponding modified lightfield image 151 for display at the left display 110. Likewise, the GPU 132 performs this same process to generate a corresponding modified lightfield image 153 for the right display 112. As such, when the modified lightfield images 151, 153 are viewed through their corresponding lenslet arrays 124, the pre-distortion introduced in the elemental images by application of the distortion map 144 effectively cancels out the distortions introduced by the lenslet arrays 124, and thus relatively undistorted elemental images are presented to the eyes of the user, and perceived by the user's visual perception system as two stereoscopic images that are interpreted together as a 3D view of a scene.

FIGS. 2-5 illustrate various example implementations of the lenslet array 124 with various configurations to mitigate blurring and other aberrations. Note that relatively simple 3×3 or 3×5 arrays of lenslets are depicted in these figures for ease of illustration. In a typical implementation, the depicted lenslet arrays would have greater numbers of lenslets. Further, while the lenslets of the respective implementations of the lenslet array 124 are arranged in a rectangular grid pattern, in other embodiments the lenslets may be arranged in other patterns, such as a hexagonal pattern, an octagonal pattern, and the like Turning to FIG. 2, a top view 200 and corresponding cross-section view 202 along cutline A-A of a lenslet array 224 (one embodiment of lenslet array 124) are illustrated. In this embodiment, the lenslet array 224 includes a non-planar, or curved, substrate 227 (one embodiment of substrate 127) at which a plurality of lenslets are disposed, including lenslets 226-1, 226-2, and 226-3 (embodiments of lenslets 126). In the illustrated embodiment, the lenslets are disposed at a major surface 206 and project from this surface (that is, in the Z-direction). Both the major surface 206 and the opposing major surface 207 of the substrate 227 are curved along one axis, such as along the Y axis as shown by cross-section view 202, or are curved along the X axis, or are curved along two orthogonal axes, such as curved along both the X and Y axes.

As the substrate 227 is curved, the substrate 227 introduces some non-zero optical power, and thus the prescription of the substrate 227 could be configured so that the substrate 227 acts as a corrector lens itself for certain distortions introduced by the lenslets, or act to optically magnify or optically shrink the views of the elemental images in conjunction with the lenslets. As for the lenslets, in some embodiments they are uniform or otherwise have the same prescription. However, to better mitigate off-axis optical aberrations, in other embodiments, the prescriptions differ among at least some of the lenslets. To illustrate, lenslets centrally positioned in the lenslet array 224 may be radially symmetric so as to have an optical axis that is orthogonal to the local region of the substrate 227, while more peripherally positioned lenslets may have radially asymmetric so as to have an optical axis that is not orthogonal to the local region of the substrate 227. For example, the lenslet 226-2, being centrally positioned, may be formed with radial symmetry so as to have an optical axis 208 that is orthogonal to the local surface of the substrate 227 (and orthogonal to the display surface of the display panel 118), whereas the lenslet 226-1, being peripherally positioned, may be formed with an aspheric profile that results in an optical axis 210 that is at a non-zero angle (that is, not parallel) to the optical axis 208, and in fact is directed away from a center of the lenslet array 224. As a result, the optical axis of the lenslets at the periphery of the lenslet array 224 more closely matches the chief ray of the corresponding elemental image of a displayed lightfield image, and thus reduces the magnitude of any off-axis optical aberrations that otherwise would be introduced by a lenslet at the corresponding position on a conventional planar substrate. Likewise, the curvature of the substrate 227 introduces a compensating refractive power that varies toward the edge of the lenslet array.

Figure 3:
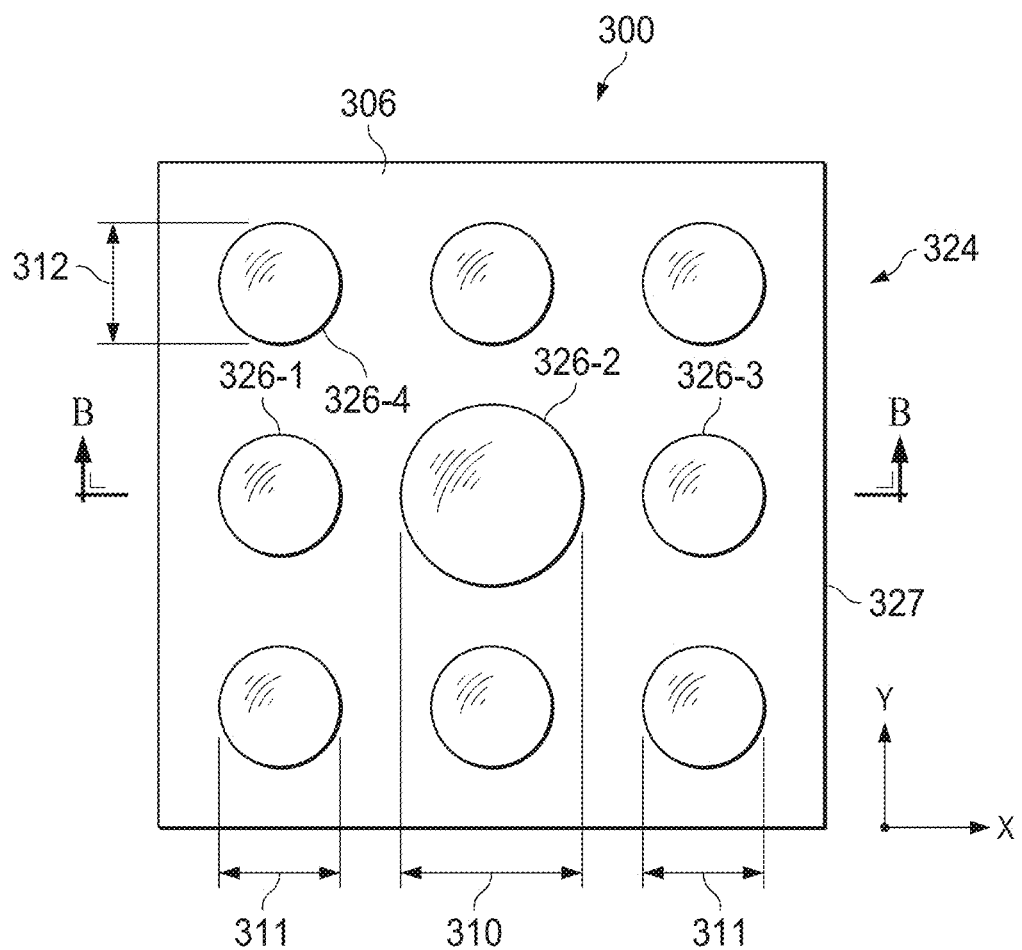
FIG. 3 is a diagram illustrating a top view and a cross-section view of an implementation of the lenslet array of FIG. 1 with lenslets of different diameters in accordance with some embodiments.
Figure 3:
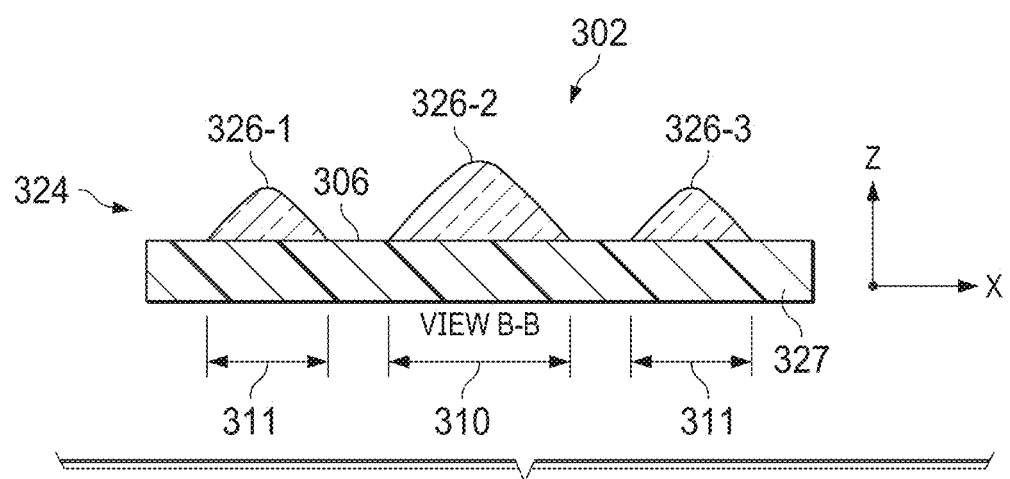

FIG. 3 illustrates a top view 300 and corresponding cross-section view 302 along cutline B-B of a lenslet array 324 (one embodiment of lenslet array 124) with lenslets of different diameters in accordance with some embodiments. In the depicted example, the lenslet array 324 includes a substrate 327 (one embodiment of substrate 127), which may be planar or, in some embodiments, curved along one or more axes as described above with reference to substrate 227 of FIG. 2. The lenslet array 324 further includes a plurality of lenslets, including lenslets 326-1, 326-2, 326-3, and 326-4 (embodiments of lenslets 126), disposed at, and projecting away from, a major surface 306 of the substrate 327. The plurality of lenslets include lenslets with different footprints, or diameters, whereby the referenced diameter of a corresponding lenslet is either determined at the interface of the lenslet with the substrate 327 or as the maximum diameter of the lenslet.

In some embodiments, the diameter of a lenslet is based at least in part on the position of the lenslet within the lenslet array 324, with the diameter decreasing as the distance of the lenslet position from the center of the lenslet array 324 increases. To illustrate, the lenslet 326-2, being positioned at the center of the lenslet array 324, has a diameter 310, whereas the lenslets 326-1 and 326-3, being positioned to the immediate sides of the center lenslet 326-2, each has a diameter 311 that is smaller than the diameter 310. Further, the lenslet 326-4, being positioned diagonal to the center lenslet 326-2 and thus most peripherally positioned, as a diameter 312 that is smaller than the diameter 311.

It will be appreciated that the amount of light passing through a lenslet is based on the diameter of the lenslet, and thus for a given focal length, elemental images viewed through lenslets with larger diameters appear brighter than elemental images viewed through lenslets with smaller diameters. Thus, in implementations whereby each of the lenslets of the lenslet array 324 has the same radius of curvature or otherwise has the same focal length, elemental images at the periphery of the lightfield image are presented with less brightness, and thus "deemphasized", compared to elemental images at the center of the lightfield image due to the decreasing diameter of the lenslets as lenslet position progresses from center to periphery. As a result, the lightfield image may be rendered in a foveated fashion such that the size of each elemental image is commensurate with the diameter of the corresponding lenslet, and the display images commensurately rendered with higher resolution in the center and decreasing toward the periphery. As blurriness and focal errors are more likely to occur at the periphery, the deemphasized size of the peripherally located elemental images causes any such focal errors to be consequently deemphasized by the user's visual perception system.

Figure 4:
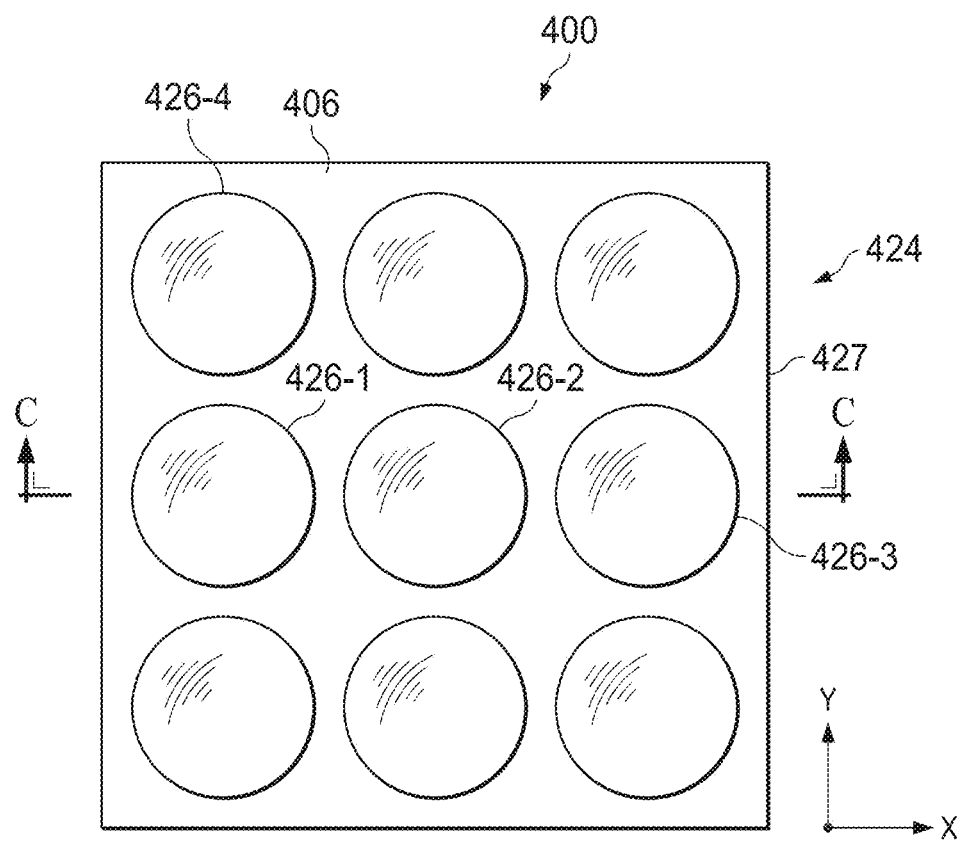
FIG. 4 is a diagram illustrating a top view and a cross-section view of an implementation of the lenslet array of FIG. 1 with lenslets of different focal lengths in accordance with some embodiments.
Figure 4:
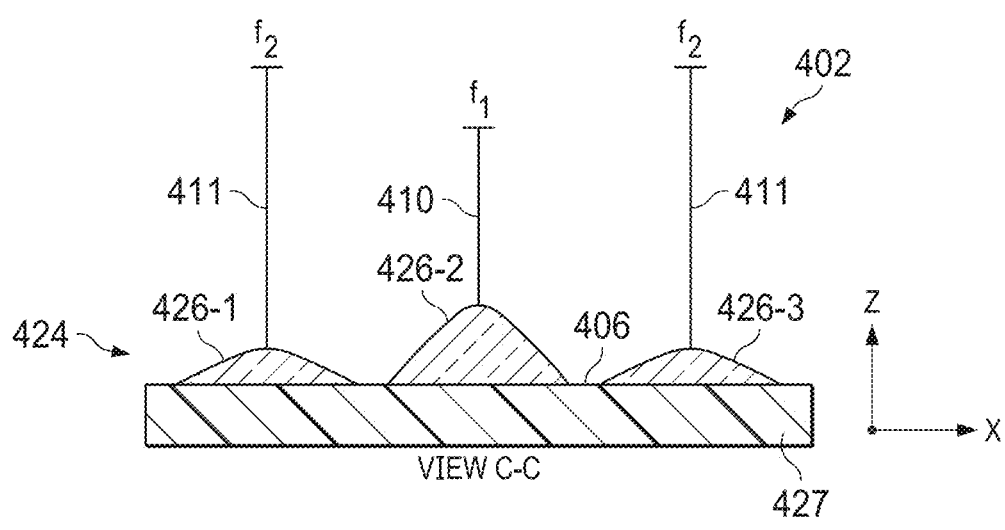

FIG. 4 illustrates a top view 400 and corresponding cross-section view 402 along cutline C-C of a lenslet array 424 (one embodiment of lenslet array 124) with lenslets of different focal lengths in accordance with some embodiments. In the depicted example, the lenslet array 424 includes a substrate 427 (one embodiment of substrate 127), which may be planar or, in some embodiments, curved along one or more axes as described above with reference to substrate 227 of FIG. 2. The lenslet array 424 further includes a plurality of lenslets, including lenslets 426-1, 426-2, 426-3, and 426-4 (embodiments of lenslets 126), disposed at, and projecting away from, a major surface 406 of the substrate 427.

The plurality of lenslets include lenslets with different focal lengths, or different optical powers. In particular, in some embodiments, the focal length of a lenslet is based at least in part on the position of the lenslet within the lenslet array 424, with the focal length increasing as the distance of the lenslet position from the center of the lenslet array 424 increases. To illustrate, the lenslet 426-2, being positioned at the center of the lenslet array 424, has a focal length 410, whereas the lenslets 426-1 and 426-3 each has a focal length 411 that is longer than the focal length 410. Further, the lenslet 426-4, being positioned diagonal to the center lenslet 426-2 and thus most peripherally positioned, may have a focal length (not shown) that is longer than focal length 411.

As described above conventional planar lenslet arrays with uniform lenslets suffer from off-axis optical aberrations because the geometrical path lengths between the elemental images and the corresponding lenslets increase toward the periphery while the focal length remains constant. However, the configuration of the lenslet array 424 mitigates such aberrations as the focal lengths of the lenslets increase toward the periphery, and thus better match the geometric paths toward the periphery.

Figure 5:
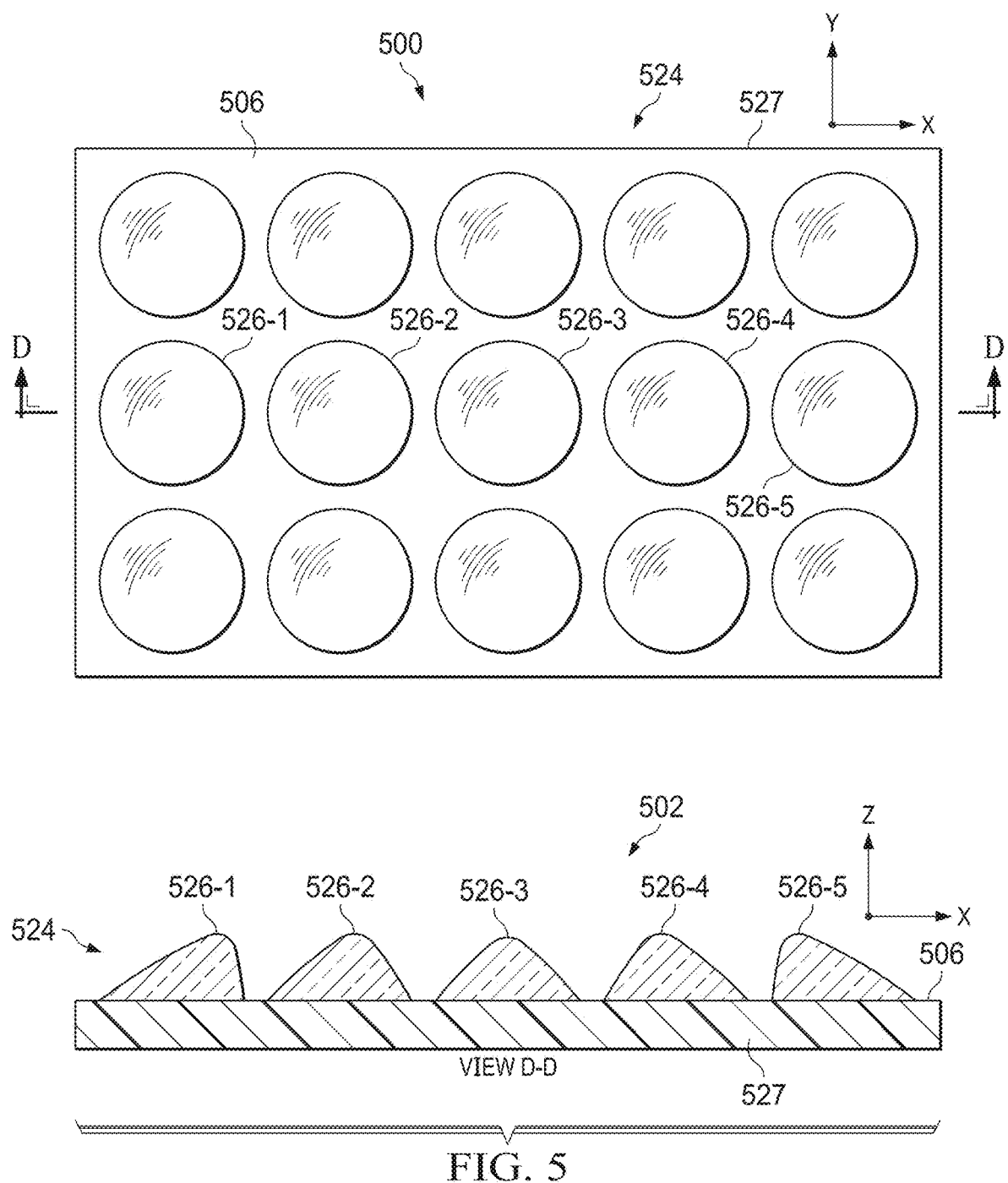
FIG. 5 is a diagram illustrating a FIG. 4 is a diagram illustrating a top view and a cross-section view of an implementation of the lenslet array of FIG. 1 with lenslets of different asphere parameters in accordance with some embodiments.

FIG. 5 illustrates a top view 500 and corresponding cross-section view 502 along cutline D-D of a lenslet array 524 (one embodiment of lenslet array 124) with aspheric lenslets of different asphere terms in accordance with some embodiments. In the depicted example, the lenslet array 524 includes a substrate 527 (one embodiment of substrate 127), which may be planar or, in some embodiments, curved along one or more axes. The lenslet array 524 further includes a plurality of aspheric lenslets, including lenslets 526-1, 526-2, 526-3, 526-4, and 526-5 (embodiments of lenslets 126), disposed at, and projecting away from, a major surface 506 of the substrate 527.

The plurality of lenslets comprise aspheric lenslets with different asphere terms for the polynomial equations that may be used to represent their non-symmetric profiles. In particular, in some embodiments, the lenslets are formed with the illustrated "wedge" shaped profile, with the "lean" of the wedge more pronounced as the distance of the lenslet position from the center of the lenslet array 524 increases. To illustrate, the lenslet 526-3, being positioned at the center of the lenslet array 524 has a nominally radially symmetric profile, whereas the lenslets 526-2 and 526-4 each has a profile that has a moderate wedge that leans moderately toward the center, and the lenslets 526-1 and 526-5, being even more peripherally positioned, may have a more pronounced wedge shape with a more pronounced lean toward the center.

Although FIGS. 2-5 illustrate example configurations of the lenslet array 124 having a non-planar substrate or lenslets of different prescriptions in the form of different diameters, different focal lengths, or different asphere terms, the lenslet array 124 is not limited to these example configurations, but instead may implement a combination of two or more of these configuration aspects. For example, in one embodiment, the lenslet array 124 may employ lenslets of different focal lengths and different diameters, on a planar substrate or on a curved substrate. In another embodiment, the lenslet array 124 may employ aspheric lenslets of different focal lengths, different sizes, and different asphere terms, on a planar or non-planar substrate. In yet another embodiment, the lenslet array 124 may employ aspheric lenslets of different sizes and different asphere terms, on a planar or non-planar substrate.

Figure 6:
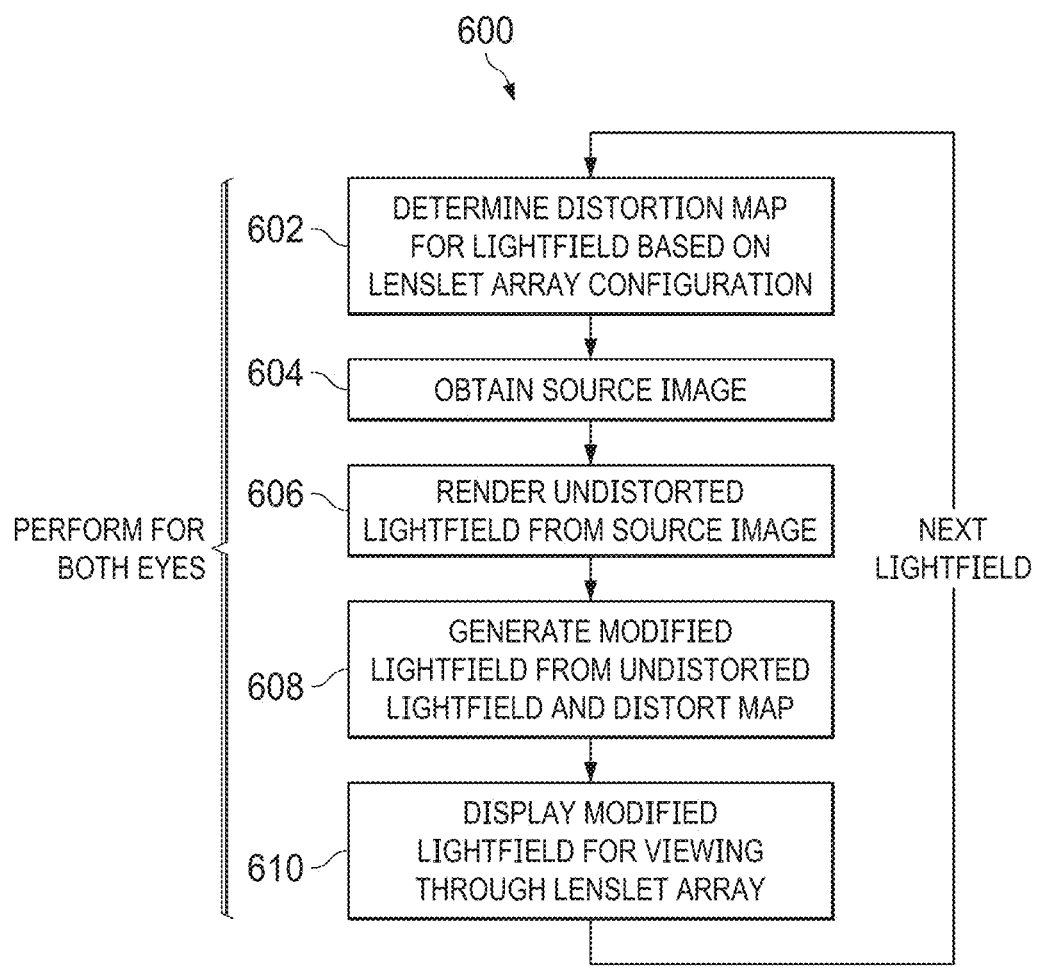
FIG. 6 is a diagram illustrating a method for generating a modified lightfield matched to the lenslets with different prescriptions of the lenslet array of the near-eye display system of FIG. 1 in accordance with some embodiments.
Figure 7:
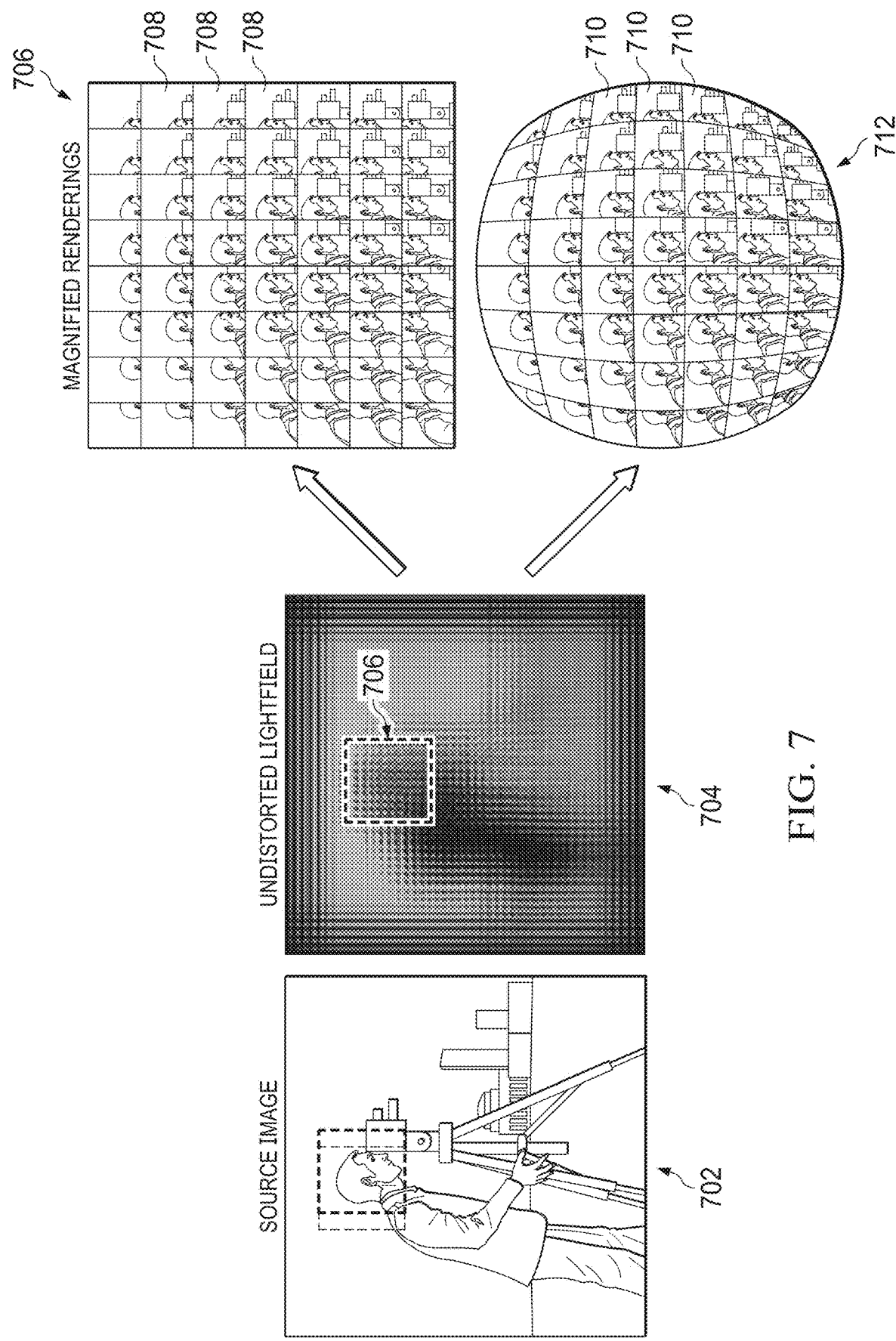
FIG. 7 is a diagram illustrating an example of the method of FIG. 6 in accordance with some embodiments.

FIG. 6 illustrates a method 600 of operation of the near-eye display system 100 for rendering and displaying lightfield images for viewing through the lenslet array 124 in accordance with some embodiments. To facilitate understanding, method 600 is described below with frequent reference to an example represented by FIG. 7. The method 600 illustrates one iteration of the process for rendering and displaying a lightfield image for one of the left-eye display 110 or right-eye display 112, and thus the illustrated process is repeatedly performed in parallel for each of the displays 110, 112 to generate and display a different stream or sequence of lightfield frames for each eye at different points in time, and thus provide a 3D, autostereoscopic VR or AR experience to the user with reduced off-axis optical aberrations.

The method 600 initiates at block 602 with the distortion map 144 being generated for a specific configuration of the lenslet array 124, whereby the distortion map 144 includes a plurality of transform matrices for transforming corresponding elemental images based on their position within the lightfield. As noted above, in some embodiments, the transform matrices are determined after the lenslet array 124 is designed, whereas in other embodiments, the lenslet array 124 and the distortion map 144 are co-optimized during development. The distortion map 144 may be stored in the memory 134 or other storage element in the form of a look-up table (LUT) or other data structure.

At block 604, the rendering component 104 obtains a source image 702 (one embodiment of source image 140) representing image content to be rendered as a lightfield image. The source image 702 may be obtained from a mass storage device, obtained from an imaging camera of the near-eye display system 100, or obtained from a remote server via a network. At block 606, a processor (e.g., the GPU 130) executing the lightfield rendering program 136 uses the image content of the source image 702 to render a raw lightfield image 704. As illustrated by magnified section 706, the raw lightfield image 704 is represented by an array of elemental images 708, each elemental image representing a view of the scene from a slightly shifter perspective. While the raw lightfield image 704 could be displayed as-is, as explained above the use of a curved substrate and/or non-uniform lenslets results in certain distortions being introduced by the lenslet array 124. Accordingly, at block 608 a processor (e.g., the GPU 130) executing the lightfield modification program 138 accesses the distortion map 144 and applies the transform matrices of the distortion map 144 to the corresponding elemental images 708 of the raw lightfield image 704 to generate pre-distorted elemental images 710 of a modified lightfield image, as represented by the magnified modified section 712 of the resulting modified lightfield image. At block 610, the modified lightfield is provided to the display panel 118 and displayed. The user views the displayed modified lightfield through the lenslet array 124, which in turn introduces corresponding distortions caused by the form of the lenslets 126 of the lenslet array 124 that cancel out the pre-distortions introduced by the transform applied at block 608. Moreover, because of the configuration of the lenslet array 124 as described herein, focus errors that otherwise would be present in a lightfield image viewed through a conventional planar lenslet array with uniform lenslets are substantially mitigated, thereby leading to an improved user viewing experience.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A near-eye display system comprising:
a display panel to display a lightfield image comprising an array of elemental images;
a lenslet array facing the display panel, the lenslet array comprising lenslets with spatially-varying prescriptions, wherein each lenslet has a prescription that is based at least in part on a position of the lenslet within the lenslet array, wherein the lenslet array comprises:
a first lenslet centrally positioned in the lenslet array and having a first diameter; and
a second lenslet peripherally positioned in the lenslet array and having a second diameter, wherein the second diameter is less than the first diameter;
wherein a non-transitory storage component to store data representative of a distortion map comprising a set of transform matrices, each transform matrix configured to pre-distort a corresponding elemental image of a lightfield image so as to compensate for distortion expected to be introduced by a corresponding lenslet of the lenslet array; and
a rendering component coupled to the non-transitory storage component and coupled to the display panel, the rendering component configured to:
render a first lightfield image comprising an array of elemental images;
modify the array of elemental images using the distortion map to generate a second lightfield image; and
provide the second lightfield image for display at the display panel for viewing by a user via the lenslet array.

2. The near-eye display system of claim 1, wherein the lenslet array comprises lenslets with different focal lengths.

3. The near-eye display system of claim 2, wherein the lenslet array comprises:
a first lenslet centrally positioned in the lenslet array and having a first focal length; and
a second lenslet peripherally positioned in the lenslet array and having a second focal length, the second focal length greater than the first focal length.

4. The near-eye display system of claim 2, wherein the first lenslet and the second lenslet are substantially equal in diameter and the first lenslet has a shorter radius of curvature than the second lenslet.

5. The near-eye display system of claim 1, wherein the lenslet array comprises aspheric lenslets with different asphere terms.

6. The near-eye display system of claim 5, wherein the lenslet array comprises:
a first lenslet centrally positioned in the lenslet array and having a symmetric profile that provides a first optical axis orthogonal to a local surface region of a substrate of the lenslet array; and a second lenslet peripherally positioned in the lenslet array and having an asymmetric profile that provides a second optical axis that is at a non-zero angle relative to the first optical axis.

7. The near-eye display system of claim 1, wherein the lenslets are disposed at a non-planar substrate.

8. A near-eye display system comprising:
a display panel to display a lightfield image comprising an array of elemental images;
a lenslet array facing the display panel, the lenslet array comprising lenslets on a non-planar substrate, wherein the non-planar substrate has a non-zero optical power, wherein the lenslet array comprises:
  a first lenslet centrally positioned at the substrate and having a first optical axis; and
  a second lenslet peripherally positioned and having a second optical axis that is at a non-zero acute angle to the first optical axis;
a non-transitory storage component to store data representative of a distortion map comprising a at least one transform matrix configured to pre-distort one or more elemental images of a lightfield image so as to compensate for distortion expected to be introduced by the non-planar substrate of the lenslet array; and
a rendering component coupled to the non-transitory storage component and coupled to the display panel, the rendering component configured to:
  render a first lightfield image comprising an array of elemental images;
  modify the array of elemental images using the distortion map to generate a second lightfield image; and
  provide the second lightfield image for display at the display panel for viewing by a user via the lenslet array.

9. The near-eye display system of claim 8, wherein the non-planar substrate is curved about a single axis.

10. The near-eye display system of claim 8, wherein the non-planar substrate is curved about two orthogonal axes.

11. The near-eye display system of claim 8, wherein at least some of the lenslets are rotationally asymmetric.

12. The near-eye display system of claim 8, wherein each lenslet has a prescription that is based at least in part on a position of the lenslet within the lenslet array.

13. A method for displaying lightfield images at a near-eye display system, the method comprising:
accessing a distortion map for a lenslet array having lenslets with spatially-varying prescriptions, the distortion map comprising a plurality of transform matrices, each transform matrix configured to pre-distort a corresponding elemental image of a lightfield image to compensate for distortion expected to be introduced into that elemental image by a corresponding lenslet of the lenslet array;
modifying a lightfield image using the distortion map to generate a modified lightfield image;
providing the modified lightfield image to a display panel of the near-eye display system for display to a viewer through the lenslet array,
wherein the lenslet array comprises lenslets of different diameters, and
the lenslet array comprises lenslets of different focal lengths.

14. The method of claim 13, wherein the lenslet array comprises lenslets of different asphere terms.

15. The method of claim 13, wherein the lenslet array further comprises a non-planar substrate.

* * * * *

UNITED STATES PATENT AND TRADEMARK OFFICE
CERTIFICATE OF CORRECTION

PATENT NO. : 10,678,049 B2
APPLICATION NO. : 15/832012
DATED : June 9, 2020
INVENTOR(S) : John D. Perreault and Patrick Llull It is certified that error appears in the above-identified patent and that said Letters Patent is hereby corrected as shown below:

In the Claims

At Column 10 Line 30, please delete the word "wherein"

Signed and Sealed this
Twenty-seventh Day of December, 2022

*Katherine Kelly Vidal*

Katherine Kelly Vidal
*Director of the United States Patent and Trademark Office*